United States Patent [19]

Nicholas

[11] Patent Number: 4,851,827
[45] Date of Patent: Jul. 25, 1989

[54] MATRIX DISPLAY DEVICES WITH REDUNDANT DRIVING TRANSISTOR ARRANGEMENT FOR IMPROVED FAULT TOLERANCE

[75] Inventor: Keith H. Nicholas, Reigate, England

[73] Assignee: U.S. Philips Corporation, New York, N.Y.

[21] Appl. No.: 199,086

[22] Filed: May 26, 1988

[30] Foreign Application Priority Data

Jul. 3, 1987 [GB] United Kingdom ............... 8715653

[51] Int. Cl.[4] ............................................. G09G 3/36
[52] U.S. Cl. .................................... 340/811; 340/719;
340/784; 350/333; 358/236
[58] Field of Search ...................... 340/719, 784, 811;
358/236; 350/333, 332; 315/169.1

[56] References Cited

U.S. PATENT DOCUMENTS

| | | | |
|---|---|---|---|
| 4,368,523 | 1/1983 | Kawate | 358/236 X |
| 4,680,580 | 7/1987 | Kawahara | 340/719 X |
| 4,775,861 | 10/1988 | Saito | 340/784 |
| 4,792,210 | 12/1988 | Maurice | 350/333 X |

Primary Examiner—Howard W. Britton
Assistant Examiner—Mark R. Powell
Attorney, Agent, or Firm—Marianne R. Rich

[57] ABSTRACT

In a matrix display device, such as an LCD-TV, supply of data signals to each one of an array of display elements is controlled by respective switching devices circuits in response to applied switching signals. Each switching device circuit is fault-tolerant and has two branches each containing two series-connected transistors, e.g. TFTs, and connected in parallel between a data signal input and a display element electrode with the transistor gates being connected to a common switching signal input. For commonly-occuring transistor defects such a circuit can tolerate a defective transistor, thereby improving fabrication yields. Further transistor defects are accommodated for improved fault tolerance by provision of impedances (38) in the gate supply lines. The impedance may be resistors or active loads (41).

13 Claims, 2 Drawing Sheets

MATRIX DISPLAY DEVICES WITH REDUNDANT DRIVING TRANSISTOR ARRANGEMENT FOR IMPROVED FAULT TOLERANCE

BACKGROUND OF THE INVENTION

1. Field of the Invention

This invention relates to a matrix display device comprising a plurality of display elements arranged in an array, each of which comprises electrodes carried on opposing substrates with electro-optical material therebetween and is associated with switching means operable to control the application of data signals to the display element in response to switching signals being applied thereto.

A display device of this kind is suitable for displaying alpha-numeric and video information using passive electro-optical material such as liquid crystal material, electrophoretic suspensions and electrochromic materials.

In known examples of this kind of display device, the display elements are arranged in a matrix of rows and columns and are defined by respective driving electrodes on one of the substrates and opposing portions of a common electrode on the other substrate. A switching means in the form of a transistor, for example a thin film transistor, (TFT), is located adjacent the driving electrode of its respective display element on the one substrate with its drain electrode connected to the driving electrode. The source electrodes of all transistors in the same column are connected to a respective one of a set of column conductors to which data signals are applied and the gate electrodes of all transistors in the same row are connected to a respective one of a set of row conductors to which switching (gating) signals are applied to switch the transistors on. The device is driven by repetitively scanning the row conductors one at a time in sequential fashion so as to turn on all transistors in each row in turn and applying data signals to the column conductors appropriately in synchronism for each row in turn so as to build up a display. When the transistors are on, the data signals are supplied to the associated driving electrodes thus charging up the display elements. When the transistors are turned off, upon termination of the switching voltage, the charge is stored in the display elements concerned until the next time they are addressed with a scanning signal, usually, in the case of a video display, in the next field period.

Display devices of this type are generally well known. Such an active matrix addressed liquid crystal display device may typically consist of 200,000 or more display elements and be capable of displaying TV pictures. The transistors may be bulk transistors, e.g. MOSFETs, formed on a semiconductor substrate of the device. For large area display devices, TFTs deposited on a glass substrate are normally used. With the increasingly larger display areas now being proposed comes a corresponding increase in the number of display elements, and hence switching means, required.

A major problem in making large area display devices of this kind is yield. When using, for example, TFTs deposited on a glass substrate with their associated row and column conductors, just a few defective TFTs can render the device unacceptable. Depending on the nature of the defect, even one defective TFT can lead to complete rows or columns of display elements being unusable. In an attempt to overcome this problem, redundance schemes have been proposed. More particularly, it is known to provide two TFTs for each display element connected in parallel with one another with their gates connected to respective, different, row conductors. If one TFT should prove to be defective after fabrication of the array, it is disconnected from the display element address circuit, for example, by laser scribing, leaving the other TFT to perform the necessary switching function. This technique has its disadvantages however in that it can be time consuming and expensive, and may not always be accomplished satisfactorily. It is necessary to measure each display element to identify and then correct any faults, usually before completing the construction of the device.

SUMMARY OF THE INVENTION

It is an object of the present invention to provide a display device of the aforementioned kind which leads to increased yield in production.

It is another object of the present invention to provide such a display device which exhibits fault tolerance and which avoids further processing operations of the kind necessary with the above described redundancy scheme.

According to the present invention, a matrix display device of the kind referred to in the opening paragraph is characterised in that the switching means associated with each display element comprises a fault tolerant switching circuit having two branches connected electrically in parallel between a common data signal input and an electrode of the display element, with each branch comprising a plurality of transistors whose main current carrying electrodes are connected in series between the common data signal input and the picture element electrode and with the control electrodes of the transistors of both branches being connected to a common switching signal input.

In a preferred embodiment each branch comprises two series-connected transistors, for example TFTs. Although more than two transistors connected in series with one another could be used in each branch, the preferred embodiment provides a degree of fault tolerance considered sufficient with a minimum of additional components for this purpose.

When considering the more commonly occuring faults with transistors used in active matrix addressed display devices, the switching circuit of the invention can tolerate any single such fault with little or no degradation in performance. For example, a short between the main current carrying electrodes of one of the transistors, i.e. a TFT source-drain short, merely reduces the on-resistance of the switching circuit which is now controlled by its associated series-connected transistor and the parallel pair of series-connected transistors in the other branch. A source-drain open circuit increases the on-resistance but the transistors of the parallel branch still maintain the desired switching action. A control electrode, i.e. gate, open circuit will produce effectively a source-drain open circuit or short depending on the voltage of the isolated control electrode and the circuit will still function as described above with regard to these conditions.

The control electrodes of the transistors of both branches of the switching circuit are preferably connected to the common switching signal input through respective impedances. In the event of a short between a control electrode and one of the main current-carrying electrodes of the transistor concerned, the full switching signal voltage appearing at the common switching signal input should not be written onto the display element electrode rather than the data signal voltage. The impedances in the control electrode supply lines serve to limit the voltage on the control electrode for this reason. The value of the impedance should be higher, and preferably much higher, than that of the transistor in the on state in order to be most effective. Moreover, the impedance shold not slow the rise and fall of the control electrode voltage unacceptably. In the case, for example, of the display device being used to display TV pictures, having a 64 microsecond line period, the permissible maximum rise and fall time constant is preferably around 15 microseconds. A suitable impedance value is therefore chosen to meet with these requirements.

If either of the two transistors of the switching circuit immediately preceding the display element, whose output electrodes are connected directly to the display element electrode, should have a fault in the nature of a control electrode - output electrode (gate-drain) short, this would create a path through the impedance associated with the defective transistor to the switching signal input even when that transistor is in its "off" state. In this case, the impedances associated with these two transistors should preferably have a value sufficiently high to prevent the display element being excessively discharged before the display element is next addressed with a data signal in the subsequent field, which for a PAL system TV picture display would be every 20 msec.

By using such a fault tolerant switching circuit as the switching means in a matrix display device according to the invention, considerable improvements can be realised in yields compared with known display devices using a single transistor as the switching means, particularly for display devices having a large number of display elements and of a kind liable to suffer a random distribution of transistor defects. Although the numbers of transistors used in the display device is increased, for example in the case of the above-mentioned preferred embodiment by a factor of four, with consequently a greater risk of one or more of the increased number of transistors required proving to be defective, the improvement in yield is nevertheless significant. For example, if the fault rate is $10^{-4}$ (1 in every 10,000) for a single transistor in a device using single transistors as the switching means, then the fault rate for the fault tolerant switching circuit could be expected to be less than $10^{-3}$ (taking into consideration that additional components other than transistors are also needed) giving a multiple fault rate less than $10^{-6}$ for a random fault distribution. This represents a fault rate orders of a magnitude lower. Thus even if it is assumed that the single fault rate of the switching circuit is an order of magnitude higher than for a single transistor, there can still be several orders of magnitude improvement in overall yield because of the fault tolerance capability.

Obviously, fabrication of the display device according to the invention is affected to some extend because of the provision of the fault tolerant switching circuits involving numbers of components. However, processing of the transistor array is not unduly hindered as a result of the additional numbers of transistors entailed since it is relatively easy to define all the transistors simultaneously using common deposited layers. Moreover, these layers can also be utilised to form the associated impedances. Whilst, inevitably, some of the active display area of the device will be lost by the inclusion of these multi-component switching circuits, the area actually occupied by each switching circuit in relation to the area of its associated display element will still be small so that the effect is almost negligible.

The transistors may comprise FETs formed ona semiconductor, for example, silicon, substrate of the display device. Alternatively, the transistors may be thin film transistors, formed on a transparent substrate such as glass using, for example, amorphous silicon or polysilicon technology. In each switching circuit, the impedances may comprise resistors or active loads, such as transistors, the impedances being either entirely of one of the other type or a mixture.

Resistors meeting at least most of the operational requirements for the impedances mentioned above can be made easily. Conveniently, they may be formed from a deposited layer used in the fabrication of the transistors, for example a doped (n+) semiconductor layer serving to define contact regions of the transistors. The requirement that the resistor be capable of preventing excessive discharge of the display element within a given time period, 20 ms in the case of a TV picture display, in the event of a control electrode - output electrode short in one of the transistors immediately adjacent the display element is dependent more on the mobility and channel length of the transistors. When using amorphous silicon TFTs, therefore, this should be taken into consideration, at least, that is, so far as the transistors next to the display element are concerned. There would be less difficulty in using resistors in conjunction with polysilicon TFTs in view of the higher mobility of polysilicon, and no problems should be experienced when bulk silicon transistors are used in view of their very high mobility.

The use of an active load, for example a transistor, as the impedance is advantageous if it is considered there is a need for an impedance in the control electrode line which is of a much higher value than that of the associated transistor in the "on" state when the transistor is not being addressed. Such a load transistor would have its main current-carrying electrodes connected in series between the control electrode of its associated switching transistor and the switching signal input, and its control electrode connected also to the switching signal input. With this arrangement, if there is a control electrode-output electrode (gate-drain) short in one of the transistors which is coupled directly to the display element electrode there is still an "off" transistor load between that electrode and the switching signal input presenting a high impedance when it is not being addressed. When this load transistor is being addressed, and hence in its "on" state, the resistance is much lower, though not as low as across the associated switching transistor.

The control electrode of the load transistor is preferably connected to the switching signal input through a resistance. This arrangement allows the control electrode of its associated switching transistor to be discharged before the load transistor switches off upon the disappearance of the switching signal.

BRIEF DESCRIPTION OF THE DRAWINGS

Embodiments of a matrix display device in accordance with the invention will now be described, by way of example, with reference to the accompanying drawings, in which.

DESCRIPTION OF THE PREFERRED EMBODIMENTS

Figure 1:
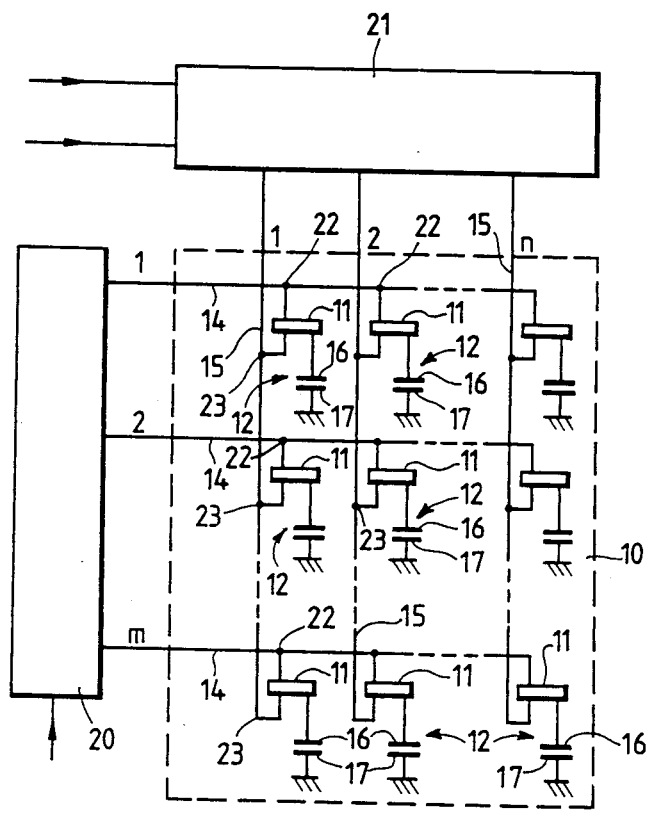
FIG. 1 shows schematically in simplified block form a liquid crystal matrix display device according to the invention having a column and row array of display elements each of which is associated with respective switching means.

Referring to FIG. 1, the matrix display device, which is suitable for displaying TV pictures, comprises an active matrix addressed liquid crystal display panel 10 which consist of m rows (1 to m) with n horizontally arranged display elements 12 (1 to n) in each row. Only a few of the display elements are shown for simplicity. In practice, the total number of display elements (mxn) in the matrix array may be 200,000 or more.

Each display element 12 has associated therewith a switching means 11 which serves to control the application of data signal voltages to the display element. The switching means 11 associated with all display elements 12 in a respective row are controlled via a common row conductor 14 which is supplied with a switching signal and to which the switching means are connected at points 22. The switching means 11 associated with all display elements 12 in a respective column are connected at points 23 to a common column conductor 15 to which data signal voltages for the display elements concerned are supplied. Thus there are m row conductors 14 and n column conductors 15, the two sets of conductors extending at right angles to one another.

Outputs from the switching means 11 are connected to an electrode 16 of their respective display elements carried on a substrate of the device together with the conductors 14 and 15 and the switching means 11. A counter electrode 17 common to all display elements is carried on another substrate parallel to, and spaced from, this one substrate with TN liquid crystal material disposed therebetween. The opposing substrates, which may be of glass, are provided with polariser and analyser layers in conventional manner. The liquid crystal material modulates light transmitted through the display elements according to the voltage applied thereacross, with each display element, defined by a respective electrode associated with a switching means on one substrate, an opposing portion of the common electrode on the other substrate and liquid crystal material therebeween, being operable to vary light transmission through the panel in accordance with a drive voltage applied across its respective electrodes. The device is driven on a row at a time basis by scanning the row conductors 14 sequentially with a switching signal so as to turn on all the switching means in each row in turn and applying data signals to the column conductors for each row of display elements in turn as appropriate and in synchronism with the switching signals so as to build up a complete display picture. In the case of a TV display, these data signals comprise video information signals with each row of display elements being provided with video information signals corresponding to a TV line. Using one row at a time addressing each switching means 11 of the addressed row is switched on for a time TL during which the video information signals are transferred from the column conductors 15 to the display elements 12. During the remainder of the field time Tf (Tf being approximately equal to m.TL) the switching means are off and their function is to keep the video information voltage across the liquid crystal by virtue of the natural capacitance of the display element. Following row addressing and the termination of the switching signal, the switching means 11 of the row turn off thereby isolating the display elements from the conductors 15 and ensuring the applied charge is stored on the display elements. The display elements stay in the state into which they were driven, determined by the applied data signal, until the next time the switching means are addressed, usually in the next field period.

The row conductors are addressed with switching signals by a digital shift register circuit 20 supplied with regular timing pulses. Video information (data) signals are supplied to the column conductors 15 from an analogue shift register circuit 21, comprising one or more shift registers, acting as a sample and hold circuit. The circuit 21 is supplied with video signals and timing pulses in synchronism with row scanning and provides serial to parallel conversion appropriate to the row at a time addressing of the panel 10.

The basic construction and operation of the display device is similar in many respects to that of a conventional active matrix addressed liquid crystal display device using a single transistor, for example a thin film transistor, as the switching means for each display element. Such conventional devices are well known and widely described and documented elsewhere and for this reason it is considered unnecessary to describe here in detail the general construction and operation of the display device according to the invention. For further information in this respect, reference may be made to, for example, the paper entitled "Liquid Crytal Matrix Displays" by Lechner et al, published in Proceedings of the IEEE, Vol. 59, No. 11, November 1971, pp. 1566–1579.

The display device according to the invention also uses transistors for the switching means but differs from these known devices in that the switching means employed in the display device of FIG. 1, unlike the switching means of the known devices, is fault tolerant.

In using fault tolerant switching means the device of the present invention is able to cope to a greater extent with the most commonly occurring transistor defects so that the device can still operate satisfactorily even with a number of randomly distributed defective transistors.

Each switching means comprises a fault tolerant switching circuit. With regard to FIG. 2, there is shown diagrammatically the circuit of one embodiment of a fault tolerant switching circuit and its associated display element. The switching circuit comprises two branches connected electrically in parallel between the point 22 on the associated column conductor 15, constituting a data signal input, and the display element electrode 16. Each branch has a pair of TFTs 32, 33 and 34, 35 respectively, connected with their main current carrying electrodes in series, that is with the drains of TFTs 33 and 35 being connected to the sources of TFTs 32 and 34 respectively. The sources of TFTs 33 and 35 and the drains of TFTs 32 and 34 are connected to the point 22 and display electrode 16 respectively. The gates of all TFTs 32 and 35 are connectd to a common point 23, constituting a switching signal input, on the associated row conductor 14 via respective impedances 38. The TFTs may be amorphous silicon or polysilicon TFTs formed on a glass substrate.

Alternatively, transistors such as bulk silicon FETs formed on a silicon substrate of the display device may be used.

In operation of the switching circuit, and assuming that none of the TFTs 32 to 35 is defective, a switching signal on the row conductor 14 turns on all four TFTs 32 to 35. A data signal simultaneously applied to column conductor 15 is therefore transferred to the display element electrode 16 via both branches of the swithcing circuit.

However, the switching circuit is able to tolerate any single defective TFT, that is, one which does not exhibit the desired operational characteristics or switching behaviour, with little or no degradation in performance.

A source-drain short in any one TFT merely reduces the on-resistance of the switching circuit and the circuit is then controlled by the TFT in series with the defective TFT of the one branch concerned and the parallel pair of series-connected TFTs of the other branch. A source-drain open circuit of any single TFT increases the on-resistance of the circuit but the pair of TFTs in the other, parallel, branch still maintain the required switching action. A gate open circuit will effectively simulate a source-drain open circuit or short in the TFT concerned depending on the voltage on the isolated gate and operation of the circuit in this situation will therefore be as described above.

In order to prevent the possibility of a gate-source or gate-drain short in one of the TFTs 32 and 35 causing the "on" voltage applied to the gate, corresponding to the switching signal voltage, rather than the data signal voltage to be written onto the display element electrode 16 the values of the impedances 38 are chosen to be much higher than those between the source and drain of the respective TFTs in their "on" state. At the same time, the values of the impedances 38 are chosen so as not to slow the rise and fall of the voltage on the TFT gates beyond a predetermined limit. For example, in the case of a PAL system TV display having a 64 microsecond line period, thie rise and fall in voltage preferably should not be increased beyond approximately 15 microseconds so as to allow adequate time for loading the display elements. In determining the choice of impedance value to meet both these criteria consideration will need to be given also to the TFTs' mobility, but even for low mobility TFTs appropriate impedance values for a TV display are readily achievable.

Special considerations apply to the two TFTs 32 and 34 immediately next to the display element electrode 16. In the event of one of these two TFTs having a fault in the nature of the gate-drain short, a conducting path is then established from the electrode 16 to the row conductor 14 through the associated impedance 38 even when the TFT's gate is not being addressed with a switching signal. The impedances 38 associated with at least the TFTs 32 and 34 should therefore have a value adequately high to prevent any significant discharging of the display element during the interval after it has been addressed and loaded and before it is next addressed in the subsequent field period, which will be around 20 msec. for a PAL system TV display.

In one version of the fault tolerant switching circuit, the impedances 38 are in the form of resistors. Resistors meeting the aforementioned value requirements can be formed in a variety of ways. It is particularly convenient in this respect to utilise portions of a layer, either doped or undoped, provided for the fabrication of the TFTs for example portions of the N+ layer deposited on the device's substrate and used to provide contact regions for the TFTs which are not actually used for this purpose. Where instead of TFTs bulk transistors formed on a semiconductor substrate are used, portions of the N+ layer formed in the semiconductor substrate may be employed for this purpose.

The ease with which the requirement that the resistors associated with at least those TFTs, 32 and 34, adjacent the display element electrode 16 have a value sufficiently high to prevent any significant discharge of the display element between addressing can be met will depend on the mobility and length of the transistor's channel. It can be shown that, to a first approximation for autoregistered transistors, resistors of suitable value can be determined if the channel mobility, measured in square centimetres per volt second, is greater than one tenth the square of the transistor channel length, measured in micrometres. Because of this, it might be more convenient to use, for example, polysilicon TFTs rather than the lower mobility amorphous silicon TFTs, to meet this particular requirement. Bulk silicon transistors would also be suitable in view of their high mobility.

By way of illustration, the components of the switching means in this particular embodiment have the following values and characteristics. It will be apparent however to persons skilled in the art that these particular values and characteristics may be varied whilst still satisfying the above-described requirements for the switching means. In this example, in which a-Si TFTs are used, the transistor capacitance (i.e. gate-channel capacitance) is approximately 2fF and the display element capacitance is around 2pF. The resistance value of the impedances 38 is then chosen to be approximately $10^{10}$ ohms, these impedances being formed using a-Si material. The TFTs each have a channel length and a channel width of approximately 3 micrometers, giving around $5 \times 10''$ carriers per volt. The channel mobility as a result is approximately 20 square centimeters per volt second and the resistance of the channel is around 1 M ohm.

Figure 3:
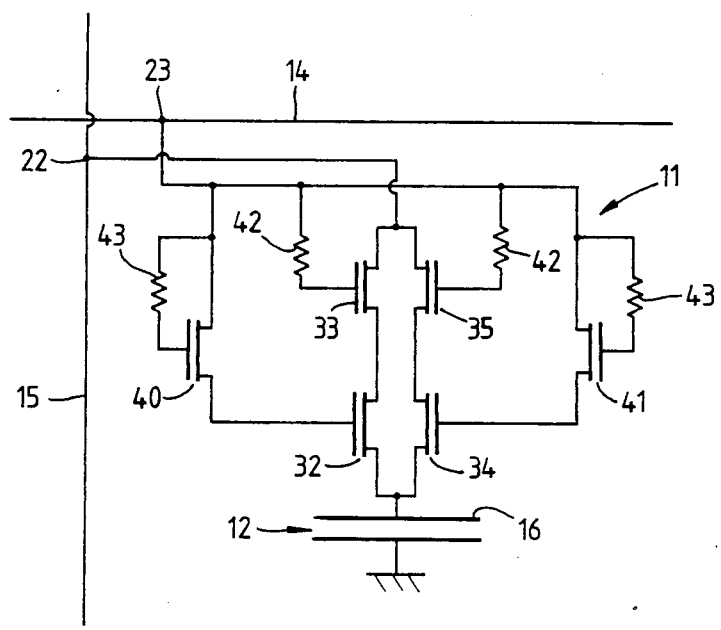
FIG. 3 is similar to FIG. 2 but shows diagrammatically an alternative form of switching means associated with a typical one of the device's display elements.

A for a high impedance value in the gate line, that is, between the gate and the row conductor 14, of at least the two TFTs 32 and 34 immediately preceding the electrode 16 when they are not being addressed can be achieved instead by using an active load as the respective impedance. Referring now to FIG. 3, there is shown the circuit of a second embodiment of a fault-tolerant switching circuit in which active loads in the form of transistors, 40 and 41, constitute impedances in the gate lines of the two TFTs, 32, 34 next to the display element electrode. The impedances in the gate lines of the other two TFTs are shown as comprising resistors 42.

Each of the load transistors 40 and 41 is connected such that its main current-carrying electrodes are connected in series in the gate line with its drain connected to the gate of its associated TFT 32, 34, and its source connected to the row conductor 14. The gate of each of these transistors 40 and 41 is connected via a respective resistor, 43, also to the row conductor 14. The load transistors 40 and 41 and the TFTs 32 and 34 are thus respectively connected in cascade. In normal operation, assuming none of the transistors of the circuit are defective, a switching signal on the row conductor 14 switches on the load transistors 40 and 41 which then cause the TFTs 32 and 34 to be turned on. The circuit otherwise behaves in much the same way as described with regard to the embodiment of FIG. 2. A slightly higher switching signal voltage may be necessary for this approach. The use of load transistors as impedances for the gates of the two TFTs 32 and 34 in this embodiment, however, avoids any difficulties there may otherwise have been in providing as the impedances resistors of the desired value to satisfy the described requirements. If there should be a gate-drain short in one of the TFTs 32 and 34, the associated load transistor, 40 and 41 respectively, prevents by virtue of its off-resistance during the period between addressing any noticeable discharge of the voltage on the display element electrode 16 to the row conductor 14.

When the switching circuit is being addressed with a switching signal on the row conductor 14, the load transistors 40 and 41 are on and resistance is much lower, although not as low as across the TFTs 32 and 34.

The resistors 43 are included in the gate lines of the load transistors to allow the gates of the associated TFTs 32 and 34 to be discharged before the load transistors 40 and 41 are switched off upon termination of the switching signal on the row conductor 14.

As an example of the component values and characteristics for this embodiment of switching means, and again assuming the use of a-Si TFTs, the characteristics of the TFTs 32–35 and 40–41 may be substantially as described with regard to the TFTs of the previous embodiment. The value of the resistors 42 may be substantially the same as before, that is, $10''$ ohms. The resistance value of the resistors 43 is also around $10''$ ohms. The TFTs 40 used as impedances could have higher resistances than described previously, thereby allowing TFTs with lower mobility to be used.

Figure 2:
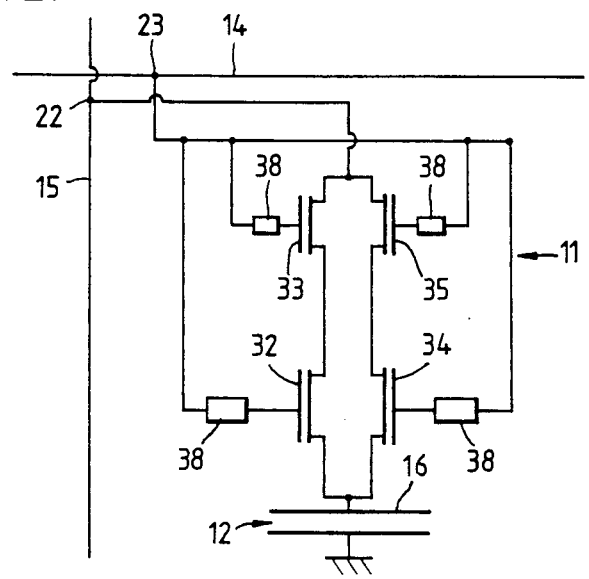
FIG. 2 shows diagrammatically and in greater detail a typical one of the display elements and one form of associated switching means of the device of FIG. 1.

The use of fault tolerant switching circuits as described with reference to FIGS. 2 and 3 offers the advantage of much higher yields of display devices in situations where a random distribution of transistor defects are likely to be experienced, even though such circuits entail larger numbers of transistors than with conventional devices employing single transistor switching elements. Even if it is assumed that the fault rate for the transistors of a switching circuit is an order of magnitude higher than for a single transistor, there can nevertheless be several orders of magnitude improvement in the overall yield because any single defective transistor in a switching circuit can be tolerated.

I claim:

1. A matrix display device comprising a plurality of display elements arranged in an array, each of which comprises electrodes carried on opposing substrates with electro-optical material therebetween and is associated with switching means operable to control the application of data signals to the display element in response to switching signals being applied thereto, characterised in that the switching means associated with each display element comprises a fault tolerant switching circuit having two branches connected electrically in parallel between a common data signal input and an electrode of the display element, with each branch comprising a plurality of transistors whose main current carrying electrodes are connected in series between the common data signal input and the picture element electrode and with the control electrodes of the transistors of both branches being connected to a common switching signal input.

2. A matrix display device according to claim 1, characterised in that each branch comprises two series-connected transistors.

3. A matrix display device according to claim 1, characterised in that the control electrodes of the transistors of both branches of the switching circuit are connected to the common switching signal input through respective impedances.

4. A matrix display device according to claim 3, characterised in that the value of the impedances is selected so as to be higher than the impedance exhibited by its associated transistor in the on state.

5. A matrix display device according to claim 4, characterised in that the value of the impedances associated with at least the two transistors next to the display element electrode is selected so as to prevent substantially the display element being discharged excessively in the period between successive addressing of the display element in the event of a control electrode/output electrode short in either of those transistors.

6. A matrix display device according to claim 3, characterised in that at least one of the impedances comprises a resistor.

7. A matrix display device according to claim 3, characterised in that at least one of the impedances comprises an active load.

8. A matrix display device according to claim 7, characterised in that the impedances associated with the transistors of the two branches next to the display element electrode comprise active loads.

9. A matrix display device according to claim 7, characterised in that the or each active load comprises a transistor.

10. A matrix display device according to claim 9, characterised in that the control electrode of the or each active load transistor is connected to the switching signal input via a resistance.

11. A matrix display device according to claim 1, characterised in that the transistors comprise thin film transistors formed on one of the substrates of the device.

12. A matrix display device according to claim 1, characterised in that the transistors comprise FETs formed on one of the substrates of the device, which substrate is of semiconductor material.

13. A matrix display device according to claim 1, characterised in that the electro-optical material comprises liquid crystal material.

* * * * *